United States Patent
Franklin

[11] 3,897,886
[45] Aug. 5, 1975

[54] DELIVERY MECHANISM FOR PACKAGING MACHINE

[76] Inventor: Kenneth Winston Franklin, 4 Tennyson Rd., Stratford-upon-Avon, England

[22] Filed: June 14, 1974

[21] Appl. No.: 479,436

[52] U.S. Cl. .............. 221/222; 214/6 DK; 221/236
[51] Int. Cl. ............................................. B65h 3/00
[58] Field of Search .......... 221/222, 266, 277, 297, 221/231, 236, 263; 214/8.5 H, 8.5 K, 6 DK, 6 BA

[56] References Cited
UNITED STATES PATENTS

| | | | |
|---|---|---|---|
| 1,767,634 | 6/1930 | Weiss | 221/222 X |
| 2,583,217 | 1/1952 | James | 221/222 |
| 3,455,484 | 7/1969 | Edwards | 221/222 |
| 3,476,290 | 11/1969 | Pajak | 221/297 |

*Primary Examiner*—Robert B. Reeves
*Assistant Examiner*—Francis J. Bartuska
*Attorney, Agent, or Firm*—Edward F. Connors

[57] ABSTRACT

A delivery mechanism including two delivery members rotatable in unison oppositely about parallel axes contained in a horizontal plane. Each member defines a channel defining base, support and stripping surfaces arranged such that whenever the members are at a loading station, the support surfaces will lie below the horizontal plane for jointly supporting an article. Rotation of the members causes the support surfaces to release the article downwardly, the stripping surfaces being engageable with the article at or after the point of release whilst the base surfaces will not engage the article before that point is reached.

9 Claims, 3 Drawing Figures

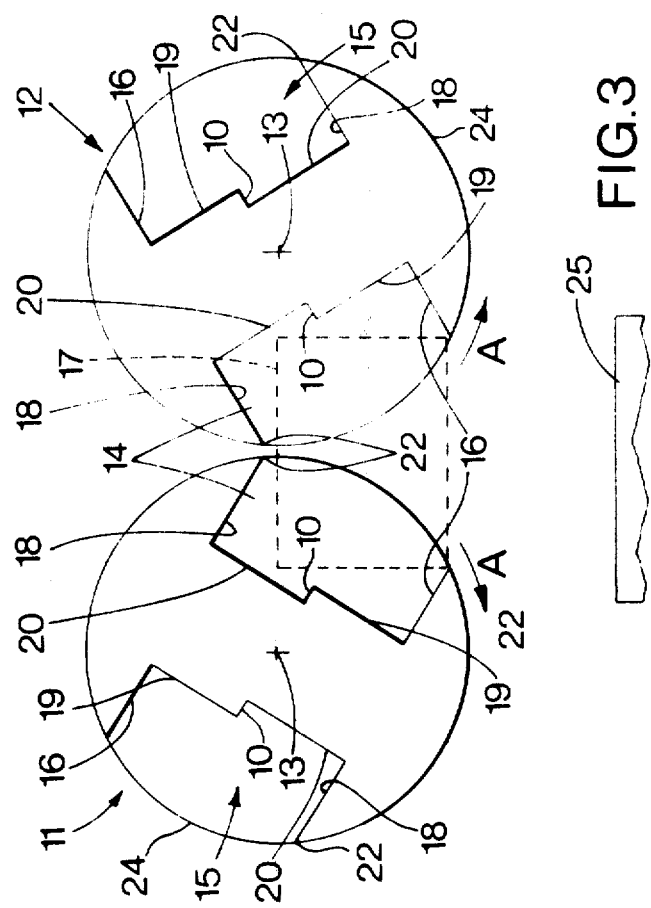

DELIVERY MECHANISM FOR PACKAGING MACHINE

This invention relates to a delivery mechanism for a packaging machine.

The delivery mechanism of the invention is particularly intended for use with a stacking mechanism for stacking articles which includes two delivery members rotatable in opposite senses about parallel horizontal axes to deliver a packet or other article supported on the members between the members and onto a support located beneath the members.

We have now found that the form taken by the delivery members can be changed from that previously known with resulting improvements to the action of the mechanism in delivering the packets.

An object of the invention is to provide a delivery mechanism with an improved form of delivery member.

According to the invention, a delivery mechanism for articles such as packets includes two delivery members which are rotatable about parallel axes contained in a generally horizontal plane and are drivable in unison in opposite senses, each delivery member defining a channel which extends parallel with the axis of rotation of the delivery member and defines a support surface and stripping surface, the channels being positioned so that whenever the delivery members are at a loading station the support surfaces will lie below the said generally horizontal plane for jointly supporting an article to be fed into said channels, rotation of said delivery members from the loading station causing the support surfaces to release the article for downward delivery, said stripping surfaces being positioned for engagement with the article at or after the point of release of the article by the support surfaces, and each channel also defining a base surface which interconnects the corresponding support and stripping surfaces and will extend each side of the said generally horizontal plane whenever the delivery members are at the loading station, each base surface being shaped so that it will not engage the article before the article is released by the support surfaces.

Preferably, the base surface includes a substantially radial surface portion, a first surface portion extending between the support surface and the radially outer end of the radial surface portion, and a second surface portion extending between the stripping surface and the radially inner end of the radial surface portion. The first surface portion and the second surface portion may occupy generally parallel planes.

Each delivery member may be formed as a solid element. In such a case, the solid element may be of circular cross-section prior to the formation of the channel. Preferably, the delivery members are of substantially equal diameter.

Each delivery member preferably defines at least two channels.

A delivery mechanism in accordance with the invention will now be described by way of example with reference to the accompanying drawings, in which:

FIG. 3 is an end elevation similar to FIG. 1 showing the delivery members about to release an article.

Figure 1:
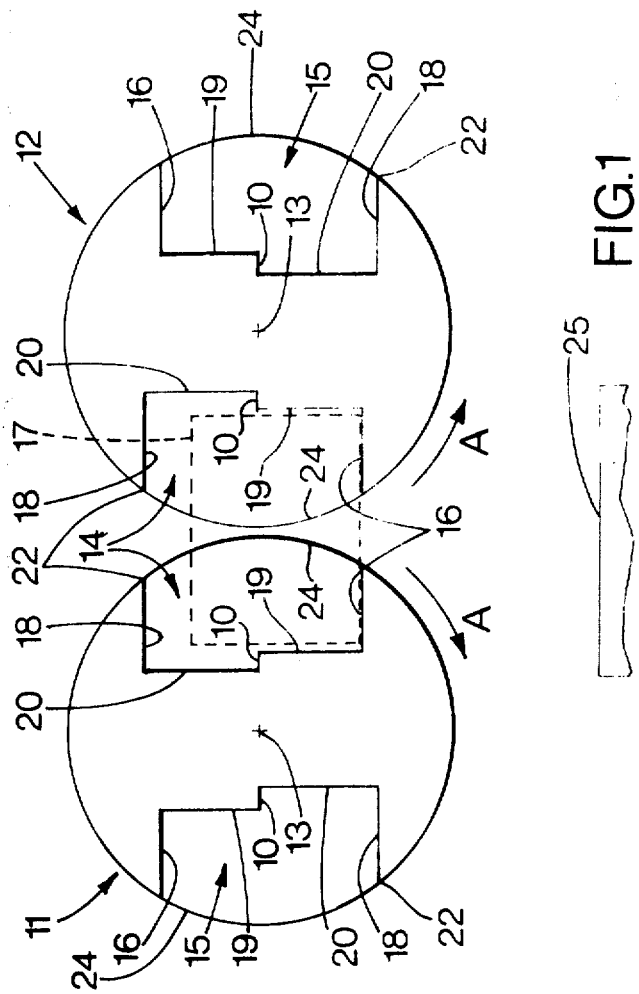
FIG. 1 is an end elevation of a pair of delivery members.

Two delivery members 11 and 12 are each formed from a cylindrical bar of material, for example aluminium or aluminium alloy, and are arranged to be mounted for rotation about their longitudinal axes 13 which occupy a common horizontal plane. The bar may be other than circular in cross-section if desired. Channel-section cut-outs 14 and 15 are machined or otherwise formed longitudinally in each member, one surface 16 of each channel forming a plane support surface for an article 17 or articles and the opposite surface 18 of each channel constituting a stripping surface, the function of which will be hereinafter described. The surfaces 16 and 18 occupy generally parallel planes.

The base of each channel 14 and 15 includes two longitudinally-extending surfaces 19 and 20 and a radial surface portion 10. The surface 19 extends between the support surface 16 and the radially outer end of the surface portion 10 and serves as a guide surface for the article 17 when the latter is being fed on to the support surface 16, and the surface 20 extends between the stripping surface 18 and the radially inner end of the surface portion 10. Thus, the surface 20 is recessed with respect to the surface 19. The bases extend each side of the horizontal plane occupied by the rotational axes 13, and the surfaces 19 and 20 are contained in substantially parallel planes.

The channels 14 in each member 11 and 12 cooperate so that the surfaces 16 jointly support the article 17 and, with the delivery members at a loading station as shown in FIG. 1, the surfaces 16 are disposed in a common horizontal plane below the horizontal plane occupied by the rotational axes 13.

Longitudinal stripping edges 22 are defined by the surfaces 18 and are arranged to engage the article 17 at or after the point of release of the article by the support surfaces 16, thereby maintaining the article in its correct orientation during discharge. Where the stripping edges 22 are to engage the article 17 after release from the support surfaces 16, the peripheral speed of the delivery members will be greater than the speed at which the article 17 will move downwardly between the members after release. Furthermore, should an article 17 jam between the delivery members 11 and 12 during delivery, the stripping edge 22 will serve to engage the article and will positively discharge the article downwardly between the members 11 and 12. The disposition of the support surfaces 16 also means that on initiation of rotation of the delivery members the surfaces 16 are quickly moved away from a supporting position.

Figure 2:
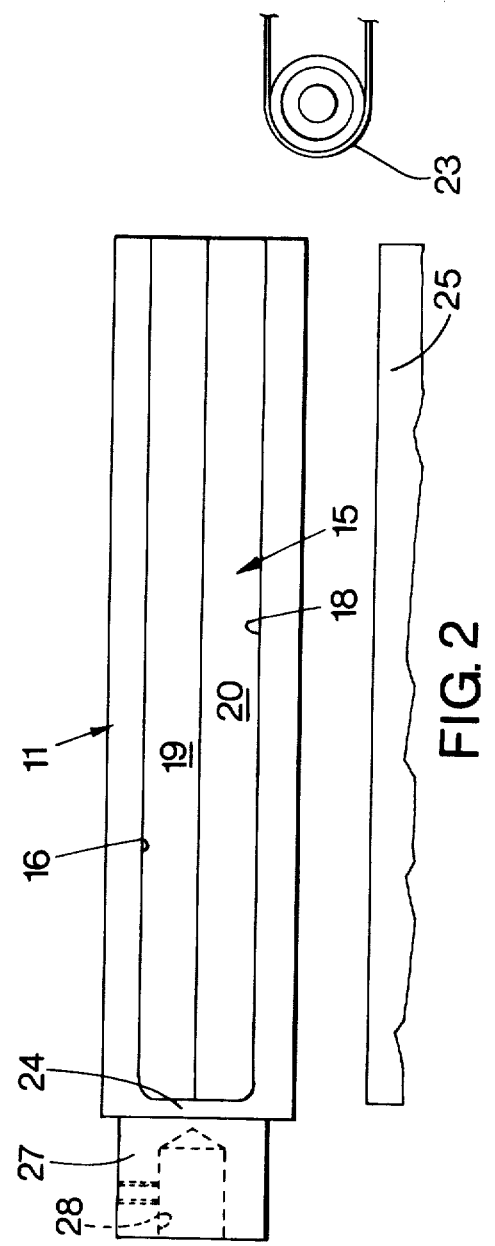
FIG. 2 is a side elevation of a delivery member of the kind shown in FIG. 1.

With the members 11 and 12 at the loading station shown in FIG. 1, an article 17 is fed on to the support surfaces 16 axially of the delivery members 11, 12 by feed means 23 located at one end of the members 11 and 12. If further articles are fed on to the surfaces 16, these push the preceding articles forward until they reach the end of the members 11 and 12 where there is formed an abutment 24 (see FIG. 2) against which the articles engage. Instead of the fixed abutment 24 integral with the respective member, adjustable abutments may be fitted in the channels 14 and 15 at the desired positions.

Once the article or articles 17 are positioned as desired on the surfaces 16, the members 11 and 12 are rotated in unison through 180° in opposite senses, as shown by the arrows A, so that the article passes downwardly between the members and is delivered on to a support 25 beneath the members.

After rotation through 180° it will be seen that the channels 15 will be disposed in a position to receive a further article or set of articles for the cycle to be repeated. Thus the members are rotated through a series of 180° increments.

The illustrated delivery members 11 and 12 are intended for use in the arrangement disclosed in our prior co-pending application Ser. No. 1145/71, the delivery members replacing those disclosed in that Application. The articles delivered by the members 11 and 12 can be stacked on the support 25 in the manner disclosed in co-pending application Ser. No. 1145/71 or alternatively the support 25 may be a conveyor for conveying the articles to, for example, a wrapping mechanism.

It will be appreciated that each delivery member 11 and 12 is in driving connection with drive means (not shown) for driving the members in unison as described. Such drive means is connected to a drive end 27 (see FIG. 2) on each delivery member, formed with a bore 28 for receiving part of the drive means.

Referring to FIG. 3, the delivery members are shown in a position in which the article 17 is at the point of being released. With the article 17 in this position, the right and left hand upper edges, as viewed in the drawing, of the article 17 are received in the recesses adjacent the stripping surfaces 18. It will be appreciated therefore that the surfaces 20 will not engage the article 17 before the article is released and will thereby inhibit any crushing of the article by the bases of the channels during delivery. The dimensions of the recesses and the distance between associated surfaces 16 and 18 can be varied for articles of different depths. The distance between the rotational axes 13 can also be varied to accommodate articles of various widths.

The delivery members of the invention are particularly useful in delivering articles having a wide range of cross-sections and particularly those which have substantial depth in relation to width. For example, the delivery members can, if necessary, deliver articles having a square cross-section.

Although the delivery members 11, 12 have been described as having channels 14, 15, one channel or three or more channels could be defined in each delivery member if necessary. In such cases, the incremental movement would be other than 180°. Furthermore, the bases of channels need not include recessed surfaces 20 as described but could each be defined, for example, by a surface disposed obliquely to its associated surfaces 16 and 18 so that the channel would be of greater depth adjacent the surface 18 than adjacent the surface 16. If desired, the surfaces 16 and 18 of each delivery member need not be contained in parallel planes. Furthermore, the surfaces 19, 20 of each channel may occupy planes which are other than parallel.

If desired, the delivery members 11, 12 may be defined by a number of assembled elements rather than formed from a solid bar of material.

What I claim as my invention and desire to secure by Letters Patent of the United States is:

1. A delivery mechanism, for articles such as packets, including two elongate delivery members which are rotatable about parallel axes contained in a generally horizontal plane and are drivable in unison in opposite senses, a channel defined by each delivery member, each said channel extending from one end of the delivery member parallel with the axis of rotation of the delivery member, article feed means positioned adjacent said one ends of the delivery members for feeding an article into said channels from said one ends axially of said delivery members, a support surface and a stripping surface defined by each said channel, the channels being positioned so that whenever the delivery members are at a loading station the support surfaces will lie below the said generally horizontal plane for jointly supporting the article fed into said channels, rotation of said delivery members from the loading station causing the support surfaces to release the article for downward delivery, said stripping surfaces being positioned for engagement with the article at or after the point of release of the article by the support surfaces, a base surface defined by each said channel which interconnects the corresponding support and stripping surfaces and which will extend each side of the said generally horizontal plane whenever the delivery members are at the loading station, each base surface being shaped so that it will not engage the article before the article is released by the support surfaces.

2. A delivery mechanism, according to claim 1, including a substantially radial surface portion defined by each said base surface, an article positioning surface extending between the support surface and the radially outer end of the substantially radial surface portion for positioning an article accurately between the delivery members during loading, and an article relief surface extending between the stripping surface and the radially inner end of the substantially radial surface portion, the distance between the said article relief surfaces of said delivery members being greater than the distance between the article positioning surfaces when the delivery members are at said loading station whereby, during delivery of the article, the article relief surfaces will not engage the article before the article is released by the support surfaces.

3. A delivery mechanism, according to claim 2, in which the article positioning surface and the article relief surface occupy generally parallel planes.

4. A delivery mechanism, according to claim 1, in which the support and stripping surfaces occupy generally parallel planes.

5. A delivery mechanism, according to claim 1, in which each delivery member is formed as a solid element.

6. A delivery mechanism according to claim 5, in which the solid element is of circular cross-section prior to the formation of the channel.

7. A delivery mechanism, according to claim 6, in which the delivery members are of substantially equal diameter.

8. A delivery mechanism, according to claim 1, in which each delivery member defines at least two channels.

9. A delivery mechanism, according to claim 1, including an article positioning surface and an article relief surface defined by each said base, said article positioning surface extending from said support surface towards said generally horizontal plane when the delivery members are at said loading station to position an article accurately between the delivery members during loading, said article relief surface extending from said stripping surface towards said generally horizontal plane when the delivery members are at said loading station, the distance between said article relief surfaces of said delivery members above said generally horizontal plane being greater than the distance between the article positioning surfaces when the delivery members are at said loading station whereby, during delivery of the article, the article relief surfaces will not engage the article before the article is released by the support surfaces.

* * * * *